US011302191B2

(12) United States Patent
Mizes et al.

(10) Patent No.: US 11,302,191 B2
(45) Date of Patent: Apr. 12, 2022

(54) METHOD AND APPARATUS FOR CALCULATING PARKING OCCUPANCY

(71) Applicant: Xerox Corporation, Norwalk, CT (US)

(72) Inventors: Howard Mizes, Pittsford, NY (US); Rakesh Suresh Kulkarni, Webster, NY (US); Peter Paul, Penfield, NY (US)

(73) Assignee: Conduent Business Services, LLC, Dallas, TX (US)

( * ) Notice: Subject to any disclaimer, the term of this patent is extended or adjusted under 35 U.S.C. 154(b) by 630 days.

(21) Appl. No.: 15/004,832

(22) Filed: Jan. 22, 2016

(65) Prior Publication Data

US 2017/0213463 A1 Jul. 27, 2017

(51) Int. Cl.
*G08G 1/14* (2006.01)
*G06T 7/73* (2017.01)
*G08G 1/01* (2006.01)
*G06T 7/254* (2017.01)
*G08G 1/04* (2006.01)
*G06K 9/00* (2006.01)

(52) U.S. Cl.
CPC ......... *G08G 1/142* (2013.01); *G06K 9/00771* (2013.01); *G06T 7/254* (2017.01); *G06T 7/74* (2017.01); *G08G 1/0116* (2013.01); *G08G 1/0129* (2013.01); *G08G 1/04* (2013.01); *G08G 1/146* (2013.01); *G06T 2207/10016* (2013.01); *G06T 2207/20224* (2013.01)

(58) Field of Classification Search
CPC .. G06K 9/00771; G06K 9/00812; G08G 1/14; G08G 1/147; G08G 1/146; G08G 1/143; G08G 1/168; G08G 1/142; G08G 1/148; G07B 15/02; G07B 15/00; H04N 7/18; H04N 7/181; G06Q 50/30
See application file for complete search history.

(56) References Cited

U.S. PATENT DOCUMENTS

| | | | |
|---|---|---|---|
| 2010/0265100 A1* | 10/2010 | Jalbout | H05B 37/0227 340/932.2 |
| 2013/0147954 A1* | 6/2013 | Song | H04N 7/181 348/148 |
| 2014/0145862 A1* | 5/2014 | Wang | G08G 1/141 340/932.2 |
| 2015/0339924 A1* | 11/2015 | Cook | G08G 1/14 382/104 |

* cited by examiner

*Primary Examiner* — Farhan Mahmud

(57) ABSTRACT

A method, non-transitory computer readable medium and apparatus for calculating a by spot occupancy of a parking lot are disclosed. For example, the method includes receiving an indication of a triggering event, sending a query to receive a first image and a second image in response to the triggering event, receiving the first image and the second image, analyzing the first image and the second image to determine a change in an occupancy status of a parking spot within the parking lot and calculating the by spot occupancy of the parking lot based on the change in the occupancy status of the parking spot.

16 Claims, 8 Drawing Sheets

METHOD AND APPARATUS FOR CALCULATING PARKING OCCUPANCY

The present disclosure relates generally to analyzing image data of a parking lot in response to detection of an event and, more particularly, to a method and apparatus for calculating a "by spot parking occupancy."

BACKGROUND

Rest stops have been built over the years at regular intervals along interstate highways. The purpose of these rest stops is to allow both passenger vehicles and trucks to take breaks as needed between the start of their travel and their destination.

These rest stops typically have a separate parking area for truck traffic. The parking needs of truck drivers are sometimes more stringent. Truck drivers are on a schedule to deliver their cargo. Federal requirements require truck drivers to take rests at regular intervals. Therefore, truck drivers would like assurance that a parking spot is available at rest stops along their journey.

Some methodologies exist today for determining parking occupancy at these rest stops. Some methods are manual. For example, an individual could monitor the parking lot at regular intervals and manually identify the spaces in the parking lot which are occupied.

Other methods are automated. However, each one of the current automated methods may have errors and accumulate errors over time. In addition, some vision based methods today are timed based. In other words, the video is continuously captured and continuously monitored. Continuously capturing video can consume a large amount of memory and storage and lead to a high cost.

SUMMARY

According to aspects illustrated herein, there are provided a method, non-transitory computer readable medium and apparatus for calculating a by spot occupancy of a parking lot. One disclosed feature of the embodiments is a method that receives an indication of a triggering event, sends a query to receive a first image and a second image in response to the triggering event, receives the first image and the second image, analyzes the first image and the second image to determine a change in an occupancy status of a parking spot within the parking lot and calculates the by spot occupancy of the parking lot based on the change in the occupancy status of the parking spot.

Another disclosed feature of the embodiments is a non-transitory computer-readable medium having stored thereon a plurality of instructions, the plurality of instructions including instructions which, when executed by a processor, cause the processor to perform operations that receive an indication of a triggering event, send a query to receive a first image and a second image in response to the triggering event, receive the first image and the second image, analyze the first image and the second image to determine a change in an occupancy status of a parking spot within the parking lot and calculate the by spot occupancy of the parking lot based on the change in the occupancy status of the parking spot.

Another disclosed feature of the embodiments is an apparatus comprising a processor and a computer-readable medium storing a plurality of instructions which, when executed by the processor, cause the processor to perform operations that receive an indication of a triggering event, send a query to receive a first image and a second image in response to the triggering event, receive the first image and the second image, analyze the first image and the second image to determine a change in an occupancy status of a parking spot within the parking lot and calculate the by spot occupancy of the parking lot based on the change in the occupancy status of the parking spot.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for calculating a "by spot occupancy" of a parking lot. As discussed above, some methods exist today for determining parking occupancy at these rest stops. Some methods are manual. For example, an individual could monitor the parking lot at regular intervals and manually enter the occupied spaces into a parking spot reservation system.

A parking space reservation system may be one way to enable tracking, communicating or providing parking space availability at a rest stop or in a parking lot. For example, if a truck driver needed to rest two hours in the future and there was a rest stop two hours further along the highway, a parking space reservation system would allow the truck driver to reserve a parking space at that particular rest stop for a certain amount of time. However, a parking space reservation system requires an enforcement mechanism. Specifically, there needs to be a mechanism to determine if a space is currently occupied or vacant so that an occupied space would not be assigned to an incoming truck in a parking space reservation system.

As discussed above, some of the current automated methods used to act as the enforcement mechanism for the parking space reservation system have errors. For example, in ground sensors may fail over time so that an unknown space occupancy is sent to a parking spot reservation system. Video sensors may incorrectly classify the occupancy of a space so that an occupied space may be classified as vacant or a vacant space may be classified as occupied. In addition, video only based systems need to continually monitor the parking area. Computer vision algorithms that process images in order to detect occupancy are computationally intensive, consume large amounts of power and lead to a high cost.

Embodiments of the present disclosure provide an automated system that acts as an enforcement mechanism for the parking space reservation systems that is also more accurate than currently used methods. For example, the method and apparatus of the present disclosure calculate a by spot occupancy of a parking lot using a combination of ingress/egress sensors and one or more video images of the parking lot. The use of ingress/egress sensors significantly increases the accuracy of computer vision systems that process the images and classify each space as occupied or vacant. In addition, the methods of the present disclosure are event driven. In other words, no processing may need to be performed until an ingress sensor event or an egress sensor event is detected.

Figure 1:
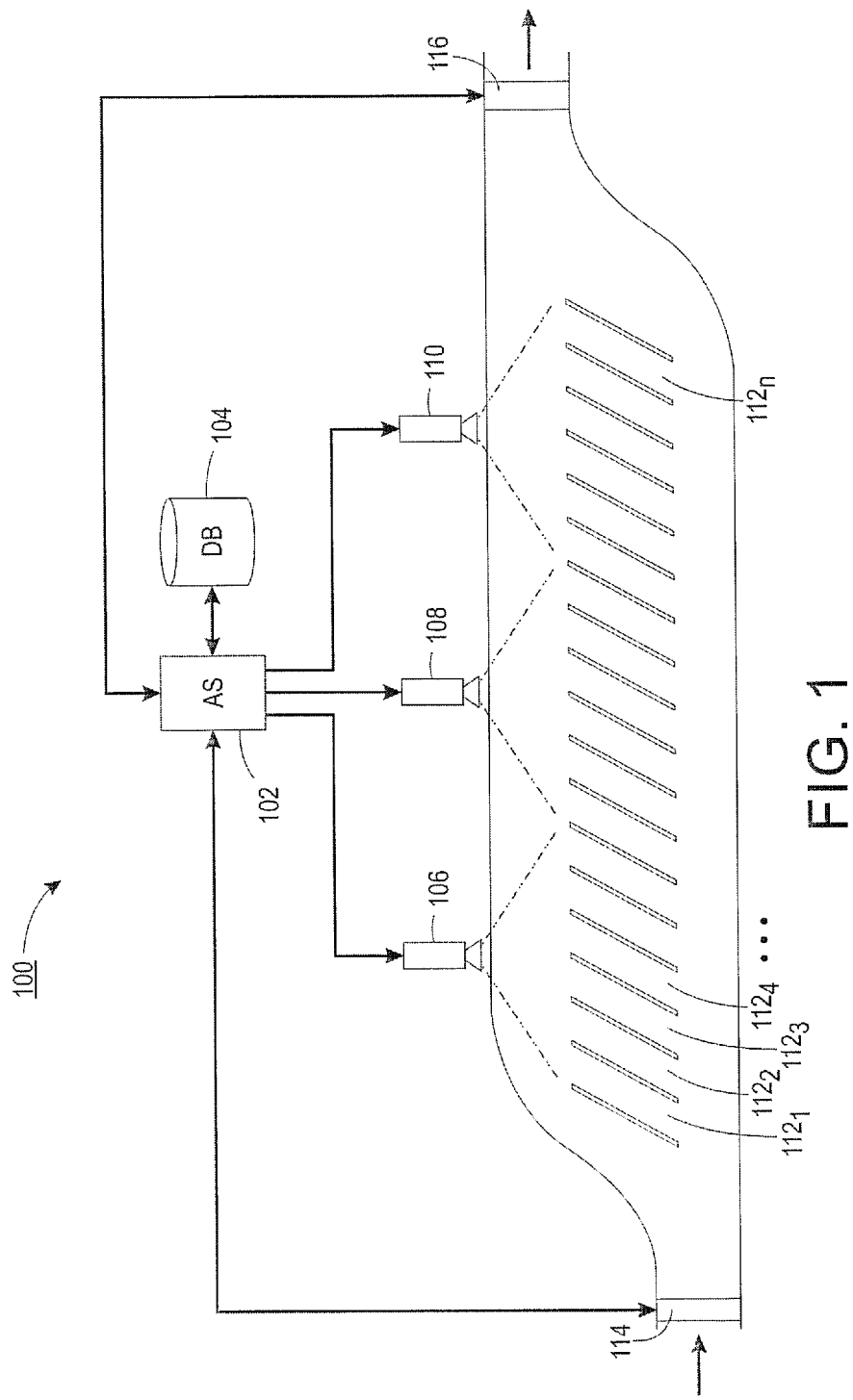
FIG. 1 illustrates an example block diagram of a system of the present disclosure.
Figure 8:
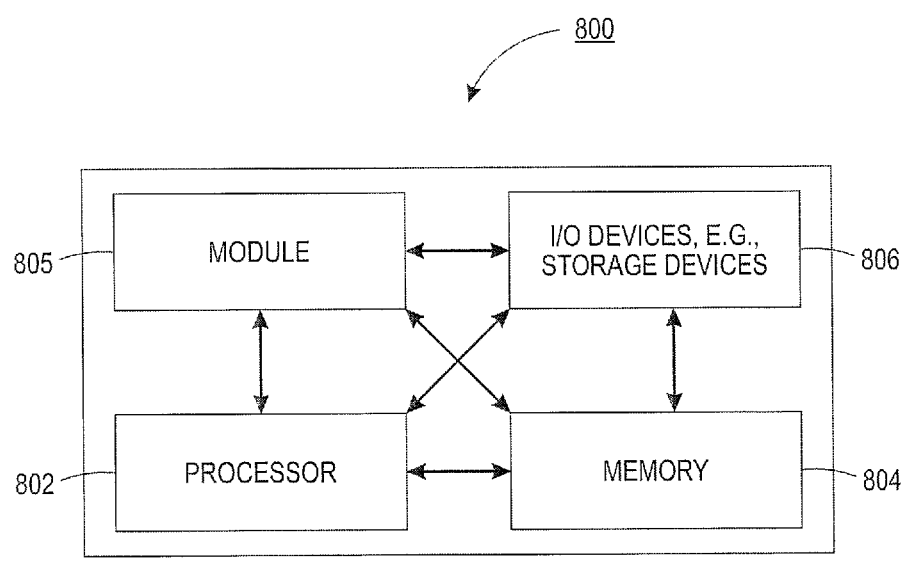
FIG. 8 illustrates a high-level block diagram of an example computer suitable for use in performing the functions described herein.

FIG. 1 illustrates an example system 100 of the present disclosure. In one embodiment, the system 100 may include an application server (AS) 102, a database (DB) 104, one or more video cameras 106, 108 and 110, an ingress sensor 114 and an egress sensor 116. In one embodiment, the AS 102 may be deployed as a computer that is dedicated to performing the functions described herein. An example of the AS 102 is illustrated in FIG. 8 and described below.

In one embodiment, the AS 102 may be in communication with the DB 104, the one or more video cameras 106, 108 and 110, the ingress sensor 114 and the egress sensor 116. The DB 104 may store various information. For example, the DB 104 may store an occupancy table that tracks which parking spots $112_1$ to $112_n$ (herein also referred to individually as a parking spot 112 or collectively as parking spots 112) are occupied or empty. The DB 104 may also store videos or images captured by the video cameras 106, 108 and 110. The DB 104 may also store various pre-defined data used by the calculating functions of the AS 102.

In one embodiment, the video cameras 106, 108 and 110 may capture video or images of the parking spots 112. Although three video cameras 106, 108 and 110 are illustrated, the system 100 may deploy any number of video cameras. For example, if the rest stop is small and only has a few parking spots 112, then only one video camera may be needed. However, if the rest stop is large and has many parking spots 112, then multiple video cameras may be needed. When multiple video cameras are needed, each of video cameras 106, 108 and 110 may monitor (e.g., capture video and images) a respective subset of the parking spots 112. For example if there are 60 parking spots 112, the video camera 106 may monitor the first 20 parking spots, the video camera 108 may monitor the second 20 parking spots in the middle and the video camera 110 may monitor the last 20 parking spots at the end.

Images captured by the video cameras 106, 108 and 110 may be analyzed to determine parking spot occupancy. The images may be analyzed based on regions of interest (ROI). An ROI may be a unique subset of an image captured by a video camera 106, 108 or 110 that appears substantially different when a parking spot 112 is occupied by a truck compared to when a parking spot 112 is vacant. There may be a unique ROI for each parking spot 112 monitored by each video camera 106, 108 or 110.

Figure 2:
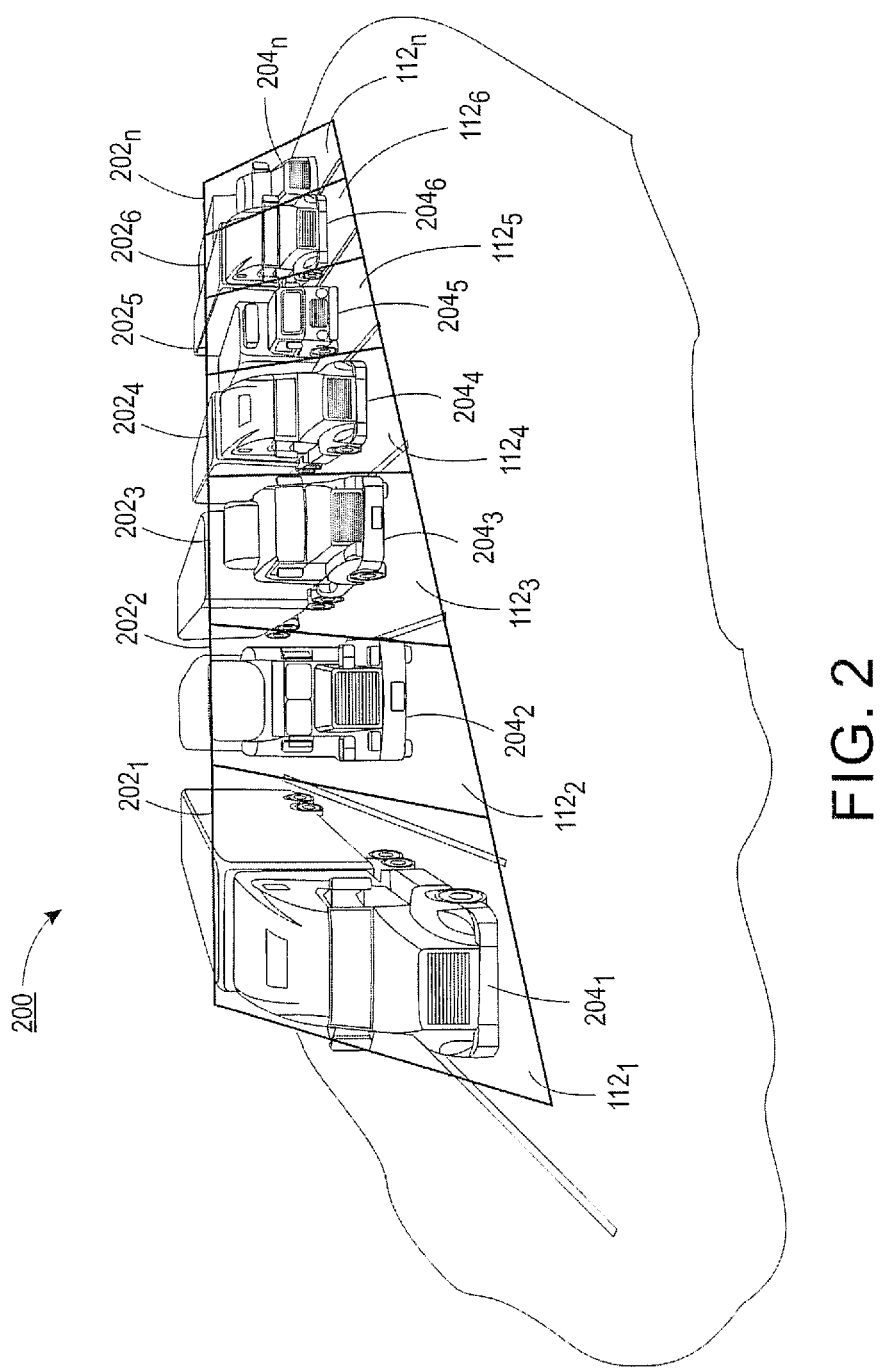
FIG. 2 illustrates an example of regions of interest of an image.

FIG. 2 illustrates an example of an image 200 having ROIs $202_1$-$202_n$ (herein also referred to individually as an ROI 202 or collectively as ROIs 202) of an image 200. FIG. 2 illustrates seven ROIs 202 that correspond to seven parking spots 112. Each one of the parking spots 112 is occupied by a vehicle $204_1$ to $204_n$ (herein also referred to individually as a vehicle 204 or collectively as vehicles 204).

For the camera position of FIG. 2, the ROIs 202 of the image 200 may show the front of a truck if the space was occupied, and either the side of an adjacent truck, bare pavement, or background images if the space was vacant. In other camera positions that may be mounted higher, the ROIs 202 may encompass the entire truck. The ROIs 202 are manually identified from each image 200 captured by the video cameras 106, 108 and 110 during setup of the video cameras 106, 108 and 110 and manually entered into the AS 102.

As noted above, the present disclosure calculates a by spot occupancy. By spot occupancy may be a binary classification of each of the parking spots 112 as either occupied or vacant. By spot occupancy may consist of a list of n binary indicators, where n is the number of available parking spaces 112 in the rest stop or parking lot. For example, if spot $112_2$, $112_4$, and $112_6$ were occupied and all the other spots were vacant, then the by spot occupancy would consist of an n-element vector of numbers {0, 1, 0, 1, 0, 1, 0, . . . , 0}, where 1 represents occupied and 0 represents vacant.

An occupancy table row is a time stamped by spot occupancy vector. For example, if the above measurement of by spot occupancy was made at 11:00 AM on Dec. 15, 2015, then this date would be appended to the n-element vector to form an occupancy table row.

Figure 9:
FIG. 9 illustrates an example occupancy table.

An occupancy table may be a growing table of occupancy table rows. Each time an event occurs due to an egress sensor 116 or ingress sensor 114 being triggered by the passing of a truck, a new occupancy row is added to the occupancy table with the current time stamp. An occupancy table can be examined by a parking lot reservation system to monitor past usage of a truck rest stop and predict future usage. An example of an occupancy table 900 is illustrated in FIG. 9.

An ingress sensor slowest travel time is defined for each video camera 106, 108 and 110 as the maximum time it takes a truck to drive from the location of the ingress sensor 114 and come to rest in one of the parking spots 112 monitored by the video camera. The slowest time can be determined by monitoring a large number of parking events during a calibration of the system and taking the longest time a truck took to drive from the ingress sensor 114 to one of the monitored parking spots 112. The slowest time can also be determined from observing behavior and driving speeds of trucks at other rest stops and calculating the estimated time for the current rest stop.

An ingress sensor fastest travel time is defined for each video camera 106, 108 and 110 as the minimum time it takes a truck to drive from the location of the ingress sensor 114 and come to rest in one of the parking spots 112 monitored by the video camera. The fastest time can be determined by monitoring a large number of parking events during the calibration of the system and taking the shortest time a truck took to drive from the ingress sensor 114 to one of the monitored parking spots 112. The fastest time can also be determined from observing behavior and driving speeds of trucks at other rest stops and calculating the estimated time for the current rest stop.

An egress sensor slowest travel time is defined for each video camera 106, 108 and 110 as the maximum time it takes a truck to begin moving from a parking spot 112 monitored by the video cameras 106, 108 and 110 to the location of the egress sensor 116. The slowest time can be determined by monitoring a large number of parking events during a calibration of the system and taking the longest time a truck took to drive from the one of the monitored parking spots 112 to the egress sensor 116. The slowest time can also be determined from observing behavior and driving speeds of trucks at other rest stops and calculating the estimated time for the current rest stop.

An egress sensor fastest travel time is defined for each video camera 106, 108 and 110 as the minimum time it takes a truck to begin moving from a parking spot 112 monitored by the video camera to the location of the egress sensor 116. The fastest time can be determined by monitoring a large number of parking events during calibration of the system and taking the shortest time a truck took to drive from the one of the monitored parking spots 112 to the egress sensor 116. The fastest time can also be determined from observing behavior and driving speeds of trucks at other rest stops and calculating the estimated time for the current rest stop.

Referring back to FIG. 1, the video cameras 106, 108 and 110 may be any type of video camera. For example, the video cameras 106, 108 and 110 may be red, green, blue (RGB) video cameras, single channel black and white video cameras that operate in the visual region or the infrared region, and the like.

In one embodiment, the video cameras 106, 108, and 110 continually capture video images and store the images in a circular buffer. The size of the circular buffer must be larger than the maximum of the ingress sensor slowest travel time and the egress sensor slowest travel time.

In one embodiment, the ingress sensor 114 may be located at an entrance to the rest stop. The ingress sensor 114 may detect an ingress sensor event (e.g., when a vehicle enters the rest stop). The ingress sensor 114 may be any type of sensor, such as for example, a video camera, an inductive loop, a laser, and the like.

In one embodiment, the egress sensor 116 may be located at an exit of the rest stop. The egress sensor 116 may detect an egress sensor event (e.g., when a vehicle leaves the rest stops). The egress sensor 116 may be any type of sensor, such as for example, a video camera, an inductive loop, a laser, and the like.

As discussed above, the AS 102 may be in communication with the video cameras 106, 108 and 110, the ingress sensor 114 and the egress sensor 116. The AS 102 may calculate an occupancy table row when a triggering event is detected (e.g., an ingress sensor event or an egress sensor event). In other words, the present disclosure provides a system and method that is event driven. Said another way, the AS 102 only queries the video cameras 106, 108 and 110 and performs an analysis of the images to calculate an occupancy table row and update the occupancy table when the triggering event is detected rather than continuously capturing video images, continuously analyzing the video images, continuously calculating the occupancy table row, and continuously updating the occupancy table.

For example, when a truck enters the rest stop, the presence of ingress sensor 114 detects the presents of the truck and an ingress sensor event is detected. The ingress sensor 114 may communicate the ingress sensor event to the AS 102. In response, the AS 102 query the video cameras 106, 108 and 110 to send two images each of the parking spots 112 that the video cameras 106, 108 and 110 are respectively monitoring.

In one embodiment, the AS 102 may wait a predefined amount of time longer than the maximum of the ingress sensor slowest travel time to the video camera 106, 108 or 110. After waiting the predefined amount of time, the AS 102 may query each camera to send two images. The AS 102 may send each camera the two times (e.g., an first time right before a vehicle enters a spot 112 and a second time right after the vehicle enters the spot 112) for which the AS 102 requires the images. The images may be extracted from the circular storage buffer in each video camera. The first image may be the image captured before the time the ingress sensor 114 is triggered plus the ingress sensor fastest travel time for a respective video camera 106, 108 and 110. The second image may be the time the image captured after the ingress sensor 114 is triggered plus the ingress sensor slowest travel time to the respective video camera 106, 108 and 110. Said another way, the video cameras 106, 108 and 110 should extract a first image immediately before the truck is estimated to arrive at a first parking spot 112 monitored by the respective video cameras 106, 108 and 110 and extract a second image immediately after the truck arrives at the parking spot 112.

In another embodiment, the query from the AS 102 may include a range of times that encompasses the times where the first image and the second image are captured and the entire video ranging between these times is sent to the AS 102. The extraction of the first image and the second image is performed on the AS 102.

In one embodiment, the DB 104 may store the ingress sensor slowest travel time and the ingress sensor fastest travel time relative to each video camera 106, 108 and 110. The sum of the trigger time of the ingress sensor 114 and the ingress sensor fastest travel time for each video camera 106, 108 and 110 may provide an upper bound for the time at which a query of the video camera 106, 108 and 110 should return, send or provide the first image. The sum of the trigger time of the ingress sensor 114 and the ingress sensor slowest travel time relative to each video camera 106, 108 and 110 may provide a lower bound for the time at which a query of the video camera 106, 108 and 110 should return, send or provide the second image. In one embodiment, a non-zero buffer time may be added to the times included in the query for the first image and the second image.

In one embodiment, upon receiving an egress sensor event, the AS 102 may query each video camera 106, 108 and 110 to send two images. The AS 102 may send each video camera 106, 108 and 110 the two times for which it requires the images. The images may be extracted from the circular storage buffer in each video camera 106, 108 and 110. The first image may be the image captured before the trigger time of the egress sensor 116 minus the egress sensor slowest travel time to a respective video camera 106, 108 or 110. The second image may be the image captured after the trigger time of the egress sensor 116 minus the egress sensor fastest travel time to that respective camera video camera 106, 108 or 110. Said another way, the video cameras 106, 108 and 110 should extract the first image immediately before the truck is predicted to leave a first parking spot 112 monitored by the respective video cameras 106, 108 and 110 and capture a second image immediately after the truck left the parking spot 112.

After the first image and the second image are captured for the triggering event, the first image and the second image may be analyzed by the AS 102 to determine whether the occupancy status of the parking spot 112 has changed. In one embodiment, the images captured by the video cameras 106, 108 and 110 may have regions of interest (ROI) that are predefined around each parking spot 112. The ROIs for each region may be stored in the DB 104.

Referring back to FIG. 2, in one embodiment, image analysis may be performed on each ROI 202 in the first image and the second image for each video camera 106, 108 and 110 using known image analysis techniques to determine an occupancy status change metric for each ROI 202. Most of the corresponding ROIs 202 in the first image and the second image will have an occupancy status change metric that is small (e.g., less than a first threshold value), indicating that the status of parking spot 112 remained unchanged between the time when the first image and the second image was captured. One of the corresponding ROIs 202 in the first image and the second image will have an occupancy status change metric that is large (e.g., greater than a second threshold value). The element corresponding to the parking spot 112 in the by spot occupancy vector will be toggled to indicate which state underwent a change in occupancy. The time of the event will be appended to the by spot occupancy vector to form an occupancy row in the occupancy table 900. The new occupancy row will be appended to the occupancy table 900 by the AS 102 and stored in the DB 104.

Figure 3:
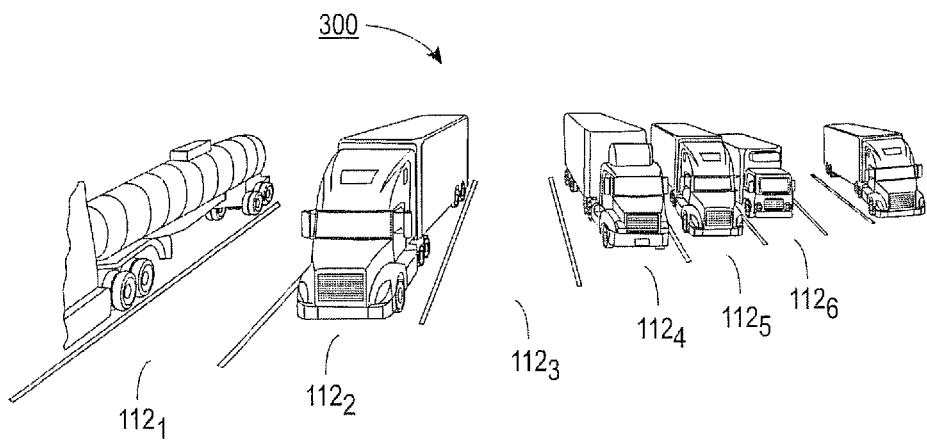
FIG. 3 illustrates an example first image.
Figure 4:
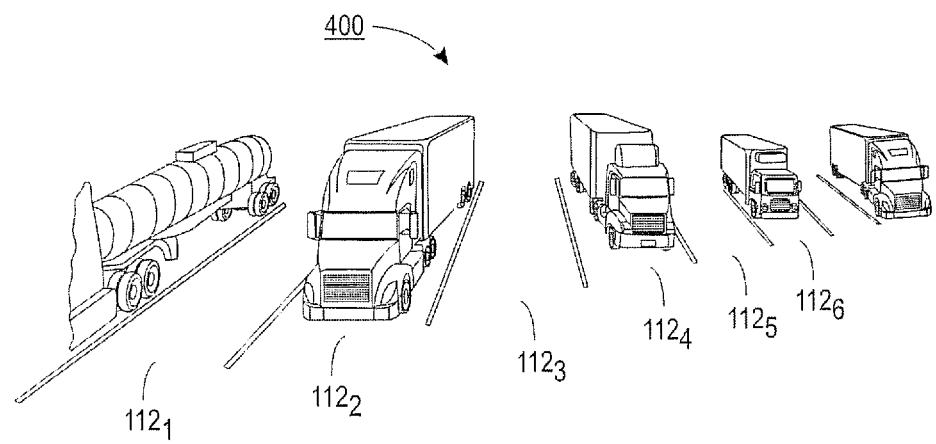
FIG. 4 illustrates an example second image.

FIG. 3 illustrates an example first image 300. FIG. 4 illustrates an example second image 400. As can be seen, the vehicle that was in parking spot $112_5$ has left. The first image 300 may have been captured by the video camera 106, for example, before a time the egress sensor event was detected minus the egress sensor slowest travel time. The second image 400 may have been captured after a time the egress sensor event was detected minus the egress sensor fastest travel time.

Figure 5:
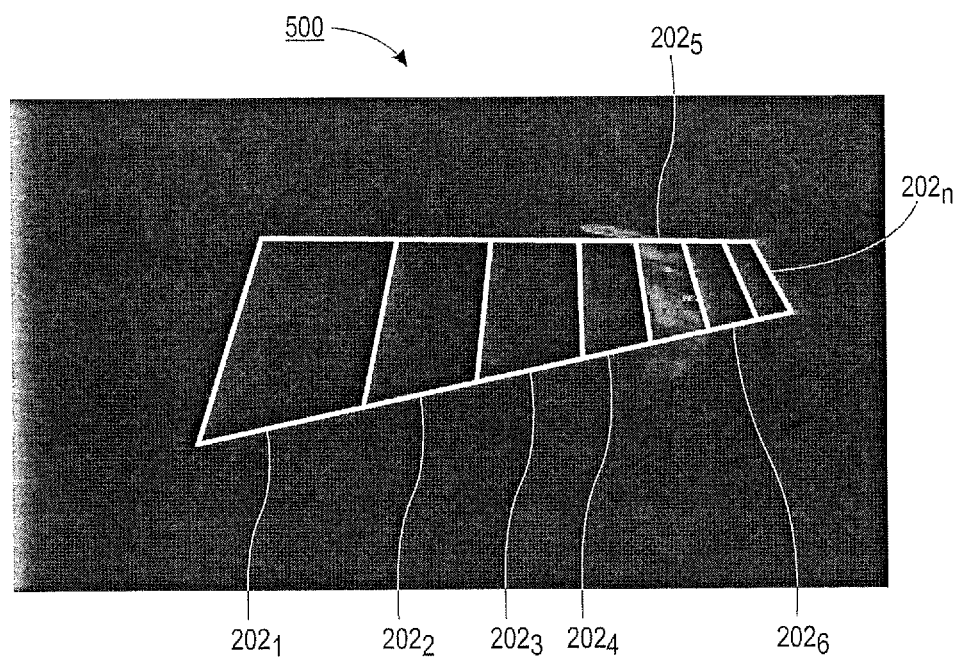
FIG. 5 illustrates an example difference image.

In one embodiment, the AS 102 may generate an occupancy status change metric for reach ROI 202 for each video camera 106, 108 and 110 in the following way. First, an ROI difference image may be calculated for each ROI 202. For each video camera 106, 108 and 110, the ROI difference images can be calculated in parallel by taking the absolute value of the difference between every pixel in the entire first image 300 and the second image 400. FIG. 5 illustrates an example difference image 500. As can be seen in the difference image 500, the ROI $202_5$ has gray pixels indicating that a difference existed between many of the pixels of the first image 300 and the second image at the ROI $202_5$. The ROI $202_5$ may correspond to the parking spot $112_5$. On the other hand ROIs $202_1$, $202_2$, $202_3$, $202_4$ and $202_6$ have mostly black pixels in the different image 500. This indicates that ROIs $202_1$, $202_2$, $202_3$, $202_4$ and $202_6$ are viewing the same scene (e.g., either a parked truck or an empty space).

In one embodiment, the difference image 500 may be generated by calculating an absolute value of a difference between gray levels of each pixel within each ROI 202 between the first image 300 and the second image 400. Notably, if no change has occurred, the gray levels for each pixel will be the same and the difference will be 0 resulting in a black pixel in the difference image 500. However, if a change has occurred, the gray levels for each pixel will be different and have a value greater than 0 resulting in a gray pixel in the difference image 500.

An occupancy status change metric may be assigned to each ROI 202 based on the mean of the gray levels of all the pixels in each ROI 202 for each video camera 106, 108 and 110 in the difference image 500. The ROI 202 with the highest occupancy status change metric may be identified as the ROI 202 having a change in the occupancy status of the parking spot 112.

In another embodiment, the AS 102 may calculate an occupancy status change metric in an alternative way. For example, a first vector of features is extracted from the first image 300 and a second vector of features is extracted from the second image 400 for each ROI 202 and for each video camera 106, 108 and 110. These features may include Histogram of Oriented Gradients (HOG), Speeded Up Robust Features (SURF), Local Binary Patterns (LBP), Haar wavelets, or color histograms. From a dataset of images in ROIs 202 that are labeled as occupied or vacant, a machine learning classifier, such as a Support Vector Machine (SVM) or Logistic Regression may be trained on the images to identify a decision boundary. This training occurs during setup of the video cameras 106, 108 and 110 or could have occurred with a set of images captured from a similarly configured truck rest stop parking lot. For each ROI 202 in the first image 300 and second image 400, the distance of the feature vector from the decision boundary is calculated to give an occupancy confidence metric of whether the parking spot 112 is occupied or not occupied. An occupancy confidence metric varies between 0 and 1, with values near zero indicating that the space is likely vacant and values near one indicating the parking spot 112 is likely occupied. The occupancy status change metric may then be calculated as the absolute value of the difference between the occupancy confidence metric for each ROI 202 for each video camera 106, 108 and 110 from the first image 300 and the occupancy confidence metric for each ROI 202 for each video camera 106, 108 and 110 from the second image 400. As a result, the parking spot $112_5$ associated with the ROI $202_5$ would be identified as having a change.

Figure 6:
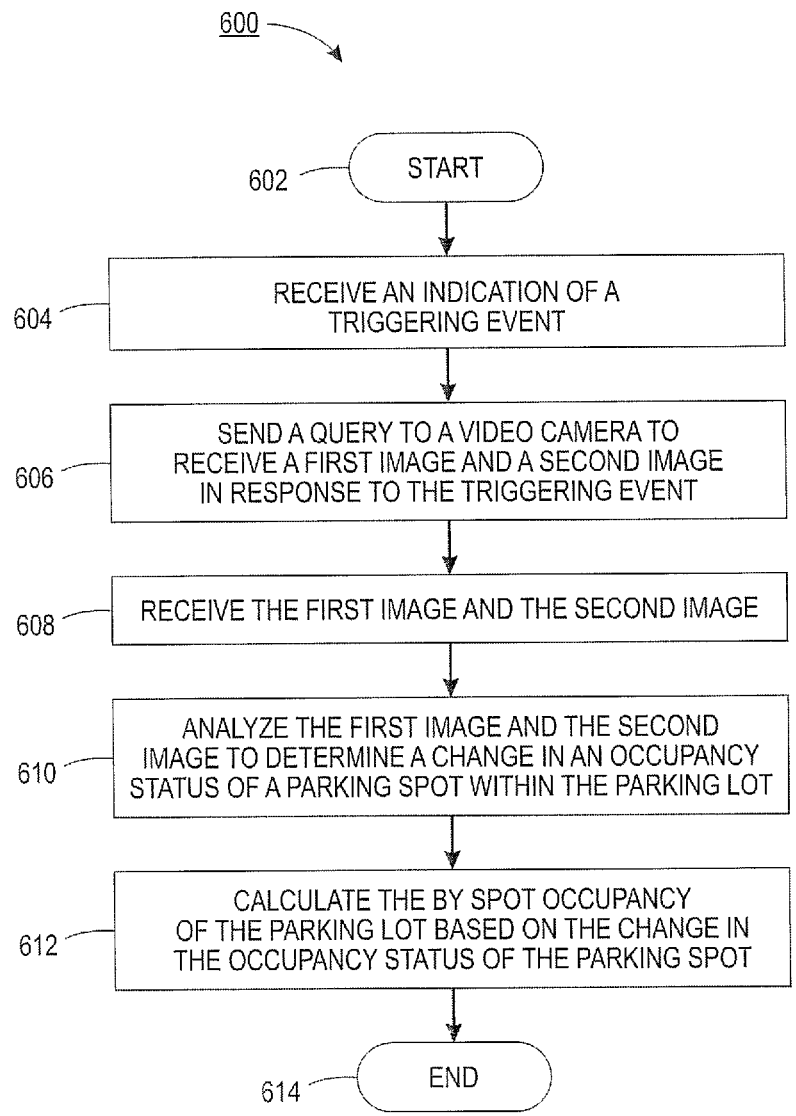
FIG. 6 illustrates a flowchart of an example method for calculating a by spot occupancy of a parking lot.

FIG. 6 illustrates a flowchart of an example method 600 for calculating a by spot occupancy of a parking lot. In one embodiment, one or more blocks or operations of the method 600 may be performed by the AS 102 or a computer as illustrated in FIG. 8 and discussed below.

At block 602, the method 600 begins. At block 604, the method 600 receives an indication of a triggering event. The triggering event may be either an ingress sensor event (e.g., a vehicle entering a parking lot) or an egress sensor event (e.g., a vehicle exiting a parking lot).

At block 606, the method 600 sends a query to a video camera to capture a first image and a second image in response to the triggering event. The query may contain the absolute time (e.g., an exact time) of the first image and the absolute time of the second image. For an ingress sensor event, the query may be delayed by a predetermined amount of time to allow for the images to be captured. For example, for an ingress sensor event, the first image should be captured immediately before the vehicle is expected to arrive at a parking spot and the second image should be captured immediately after the vehicle is expected to come to rest at the parking spot. In one embodiment, an ingress sensor fastest travel time plus the ingress trigger time or an egress trigger time minus an egress sensor slowest travel time may provide an initial time at which the video camera should be queried for the first image. An ingress sensor slowest travel time plus the ingress trigger time or an egress trigger time minus an egress sensor fastest travel time may provide a final time at which the video camera should be queried for the second image.

At block 608, the method 600 may receive the first image and the second image. For example, the video camera may transmit the first image and the second image to the AS 102 from images stored in a circular buffer in the video camera. In another embodiment, the video camera may transmit and store video images continuously in the DB 104 and the AS 102 may simply retrieve the first image and the second image from the DB 104 at the times described above based upon a time stamp on the video images.

At block 610, the method 600 analyzes the first image and the second image to determine a change in an occupancy status of a parking spot within the parking lot. For example, a difference image may be generated to determine the change. In another embodiment, feature vectors may be calculated to the first image and the second image and classified to determine the change.

At block 612, the method 600 may calculate the by spot occupancy for the parking lot based on the change in the occupancy status of the parking spot. For example, the particular parking spot that has changed from empty to occupied or occupied to empty may be updated in an occupancy table.

In one embodiment, based on a current value of an occupancy table row, a message may be transmitted wirelessly (e.g., a WiFi signal, a radio frequency (RF) signal, a cellular signal, and the like) to a parking space reservation system to indicate which parking spots in the parking lot are currently occupied and which spots are currently vacant. At block 614, the method 600 ends.

Figure 7:
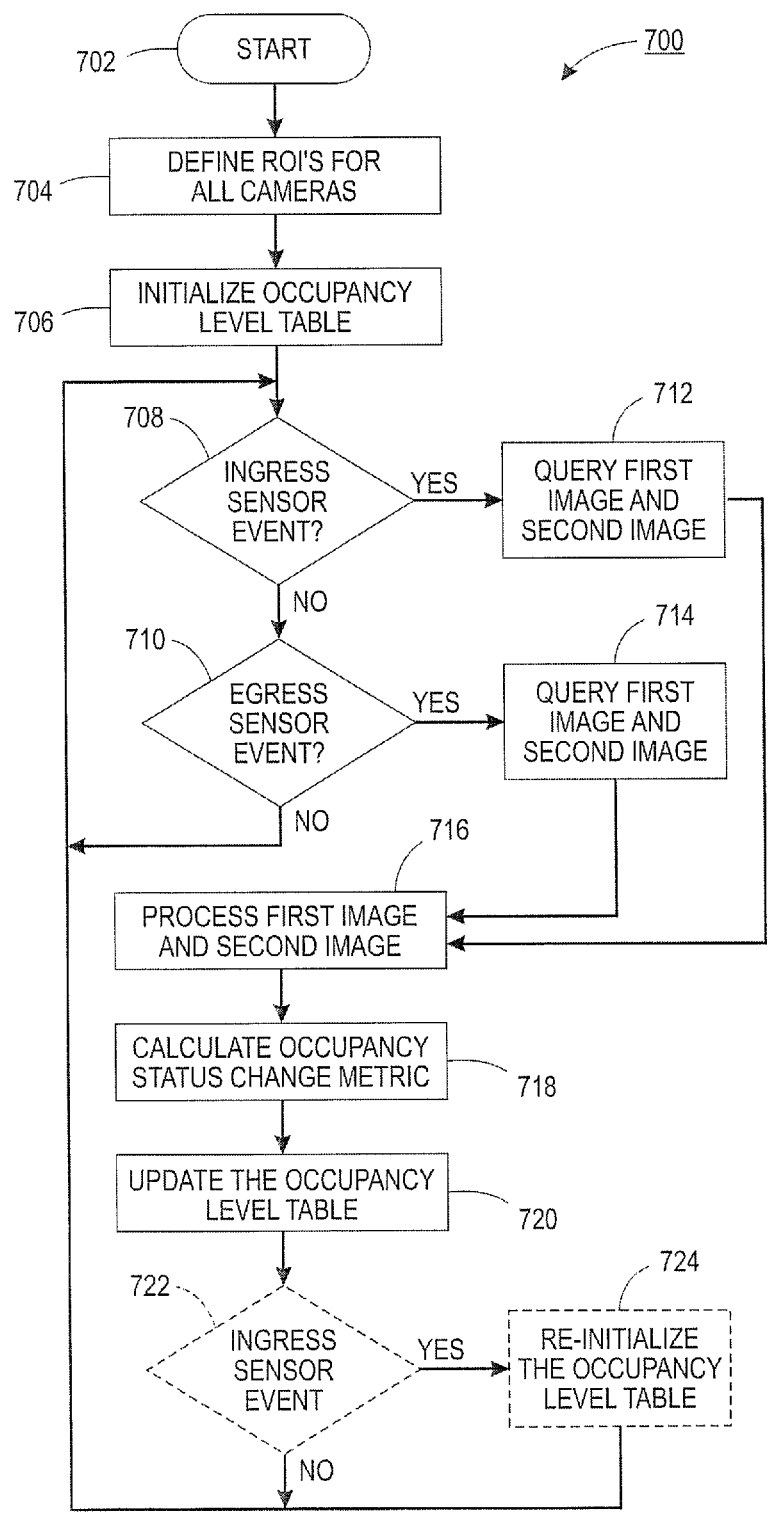
FIG. 7 illustrates a flowchart of another example method for calculating a by spot occupancy of a parking lot.

FIG. 7 illustrates a more detailed flowchart of an example method 700 for calculating a by spot occupancy of a parking lot. In one embodiment, one or more blocks or operations of the method 700 may be performed by the AS 102 or a computer as illustrated in FIG. 8 and discussed below.

At block 702, the method 700 begins. At block 704, the method 700 defines ROI's for all parking spots and for all cameras. For example, an ROI may be defined manually from images of trucks parked in specific spaces. Another approach is that any video image processing algorithm may be used for defining ROI's by identifying parking regions from lines painted on the pavement and extrapolated to where a vehicle would appear in the image. The video image captured by each camera may have a different field of view or perspective. As a result, the ROI's for each camera may be located in different areas of the video image.

At block 706, the method 700 initializes the occupancy table based on the current parking occupancy. For example, when the method 700 is initially implemented, the occupancy table may be manually populated for each parking spot in the parking lot or rest stop.

At block 708, the method 700 determines if an ingress sensor event is detected. For example, a vehicle may be detected by an ingress sensor. If the answer is yes, the method 700 proceeds to block 712.

At block 712, the method 700 queries each video camera to receive a first image and a second image for the ingress sensor event. In one embodiment, the query may be sent after waiting for a predetermined amount of time. For example, the predetermined amount of time may be based on a slowest time of a truck to reach the parking spot from the ingress sensor. The first image may be immediately before the vehicle is expected to pull into the parking spot and the second image may be immediately after the vehicle is expected to come to rest in the parking spot. The timing of when the first image and the second image is captured is described above. The method 700 then proceeds to block 716.

Returning back to block 708, if the answer is no, then the method 700 proceeds to block 710. At block 710, the method 700 determines if an egress sensor event is detected. If the answer is no, the method 700 returns to block 708 and the method 700 loops until an ingress sensor event or an egress sensor event is detected.

Returning back to block 710, if the answer is yes, then the method 700 proceeds to block 714. At block 714, the method 700 queries each video camera to receive a first image and a second image for the egress sensor event. The first image may be immediately before the vehicle is expected to pull out of the parking spot and the second image may be at after an amount of time when the vehicle is expected to have left the parking spot. The timing of when the first image and the second image is captured is described above. The method 700 then proceeds to block 716.

At block 716, the method 700 processes the first image and the second image. For example, the ROI for each camera in the first image and the second image may be processed. For example, an occupancy status change metric can be calculated from each ROI to determine if an occupancy status in a parking spot has changed. In one embodiment, a difference image for each ROI may be generated as described above. In another embodiment, an absolute difference of occupancy confidence levels from feature vectors extracted from the first image and the second image may be used to calculate an occupancy status change metric as described above.

At block 718, the method 700 calculates an occupancy status change metric. The occupancy status change metric may be used to determine whether an occupancy status change has changed. For example, the ROI with the highest occupancy status change metric may be determined to have a status change.

At block 720, the method 700 updates the spot occupancy table. For example, a timestamp may be added to a spot occupancy vector and added to the spot occupancy table. The current occupancy table may then be communicated to a parking space reservation system.

At optional block 722, the method 700 may determine if the occupancy table should be re-initialized. For example, over time it is possible that some false positives/negatives may occur over time. As a result, the occupancy table may be occasionally corrected.

If the answer to block 722 is yes, the method 700 may proceed to optional block 724. At optional block 724, the method 700 re-initializes the occupancy table. If the answer to block 722 is no, the method 700 may return back to block 708 and continuously loop. In other words, the method 700 may continuously operate once the method 700 is implemented or deployed until the method 700 is shut down.

It should be noted that although not explicitly specified, one or more steps, functions, or operations of the methods 600 and 700 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 6 and 7 that recite a determining operation, or involve a decision, do not necessarily require that both branches of the determining operation be practiced. In other words, one of the branches of the determining operation can be deemed as an optional step.

FIG. 8 depicts a high-level block diagram of an example computer that can be transformed to into a machine that is dedicated to perform the functions described herein. As depicted in FIG. 8, the computer 800 comprises one or more hardware processor elements 802 (e.g., a central processing unit (CPU), a microprocessor, or a multi-core processor), a memory 804, e.g., random access memory (RAM) and/or read only memory (ROM), a module 805 for calculating a by spot occupancy of a parking lot, and various input/output devices 806 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 805 for calculating a by spot occupancy of a parking lot (e.g., a software program comprising computer-executable instructions) can be loaded into memory 804 and executed by hardware processor element 802 to implement the steps, functions or operations as discussed above in connection with the example methods 600 and 700. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 805 for calculating a by spot occupancy of a parking lot (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for calculating a by spot occupancy of a parking lot, comprising:
   receiving, by a processor, an indication of a triggering event detected by a sensor at an entrance or an exit of a rest stop, wherein the sensor is different than a video camera monitoring the parking lot of the rest stop;
   sending, by the processor, a query to the video camera to receive a first image and a second image in response to the triggering event, wherein the first image and the second image comprise a view of each parking spot in the parking lot;
   receiving, by a processor, the first image and the second image;
   defining, by the processor, a plurality of regions of interest (ROI) for the first image and the second image, wherein each one of the plurality of ROI correspond to the each parking spot in the parking lot;
   initializing, by the processor, an occupancy table;
   analyzing, by the processor, the first image and the second image to determine a change in an occupancy status of a parking spot within the parking lot based on an analysis of the each one of the plurality of ROIs that correspond to the each parking spot in the parking lot;
   calculating, by the processor, the by spot occupancy of the parking lot based on the change in the occupancy status of the parking spot; and
   adding, by the processor, a new row to the occupancy table, wherein the new row comprises a vector having n-elements for each n-number of parking spots in the parking lot and a time stamp associated with the triggering event, wherein each element of the n-elements has a binary value based on the by spot occupancy of the parking lot that is calculated.

2. The method of claim 1, further comprising:
   updating, by the processor, the occupancy table based on the by spot occupancy that is calculated and the change in the occupancy status of the parking spot.

3. The method of claim 1, wherein the triggering event comprises an ingress sensor event.

4. The method of claim 3, wherein the ingress sensor event is detected by at least one of: a laser sensor, an inductive loop sensor, or a video sensor at an entrance of the parking lot.

5. The method of claim 3, wherein the first image is captured before a trigger time plus an ingress sensor fastest travel time and the second image is captured after the trigger time plus an ingress sensor slowest travel time.

6. The method of claim 1, wherein the triggering event comprises an egress sensor event.

7. The method of claim 6, wherein the egress sensor event is detected by at least one of: a laser sensor, an inductive loop sensor, or a video sensor at an entrance of the parking lot.

8. The method of claim 6, wherein the second image is captured at a time the egress sensor event is detected minus an egress sensor fastest travel time and the first image is captured at the time the egress sensor is detected minus an egress sensor slowest travel time.

9. The method of claim 1, wherein the analyzing comprises:
   performing, by the processor, an image analysis on the first image and the second image;
   calculating, by the processor, an occupancy status change metric for each region of interest (ROI); and
   identifying, by the processor, the change in the parking spot associated with an ROI having the highest occupancy status change metric.

10. The method of claim 9, wherein the image analysis is a generation of a difference image performed by calculating a difference between gray levels of each pixel of the first image and the second image.

11. The method of claim 1, wherein the analyzing comprises:
calculating, by the processor, a feature vector associated with each region of interest in the first image and the second image.

12. The method of claim 11, wherein the feature vector is a histogram of oriented gradients (HOG).

13. The method of claim 12, wherein the applying the HoG comprises:
classifying, by the processor, the HoG features within the each ROI of the first image and the second image as a vehicle or an empty space; and
identifying, by the processor, the change in the occupancy status of the parking spot associated with an ROI having a difference between the first image and the second image in HoG features that are classified.

14. A non-transitory computer-readable medium storing a plurality of instructions, which when executed by a processor, cause the processor to perform operations for e calculating a by spot occupancy of a parking lot, the operations comprising:
receiving an indication of a triggering event detected by a sensor at an entrance or an exit of a rest stop, wherein the sensor is different than a video camera monitoring the parking lot of the rest stop;
sending a query to the video camera to receive a first image and a second image in response to the triggering event, wherein the first image and the second image comprise a view of each parking spot in the parking lot;
receiving the first image and the second image;
defining a plurality of regions of interest (ROI) for the first image and the second image, wherein each one of the plurality of ROI correspond to the each parking spot in the parking lot;
initializing an occupancy table;
analyzing the first image and the second image to determine a change in an occupancy status of a parking spot within the parking lot based on an analysis of the each one of the plurality of ROIs that correspond to the each parking spot in the parking lot;
calculating the by spot occupancy of the parking lot based on the change in the occupancy status of the parking spot; and
adding a new row to an occupancy table, wherein the new row comprises a vector having n-elements for each n-number of parking spots in the parking lot and a time stamp associated with the triggering event, wherein each element of the n-elements has a binary value based on the by spot occupancy of the parking lot that is calculated.

15. The non-transitory computer-readable medium of claim 14, further comprising:
updating the occupancy table based on the by spot occupancy that is calculated and the change in the occupancy status of the parking spot.

16. A method for calculating a by spot occupancy of a parking lot, the method comprising:
defining, by a processor, a plurality of regions of interest (ROIs) for each image that is captured;
initializing, by the processor, an occupancy table comprising an identification of a plurality of parking spots and an indication of whether each one of the plurality of parking spots is empty or occupied;
receiving, by a processor an indication of an ingress sensor event or an egress sensor event detected by an ingress sensor at an entrance or by an egress sensor at an exit of a rest stop, wherein the ingress sensor and the egress sensor are different than a plurality of video camera monitoring the parking lot of the rest stop;
sending, by the processor, a query to the plurality of video cameras to receive a first image and a second image from each one of the plurality of video cameras in response to the triggering event, wherein the query includes a first time associated with when the first image was captured and a second time associated with when the second image was captured, wherein the first image and the second image comprise a view of each parking spot in the parking lot;
extracting, by the processor, the plurality of ROIs from the first image and the second image from each one of the plurality of video cameras, wherein each one of the plurality of ROIs is associated with a different one of the plurality of parking spots of the parking lot in the first image and the second image;
calculating by the processor, an occupancy status change metric for each one of the plurality of ROIs of the first image and the second image from each one of the plurality of video cameras;
calculating, by the processor, the by spot occupancy of the parking lot based on the occupancy status change metric; and
updating, by the processor, the occupancy table by adding a new row to indicate a particular parking spot of the plurality of parking spots that changed from empty to occupied for the ingress sensor event or from occupied to empty for the egress sensor event, wherein the new row comprises a vector having n-elements for each n-number of parking spots in the parking lot and a time stamp associated with the triggering event, wherein each element of the n-elements has a binary value based on the by spot occupancy of the parking lot that is calculated.

* * * * *